Oct. 4, 1955  R. F. FOX ET AL  2,719,624
ARTICLE HANDLING AND ORIENTING MACHINE
Filed March 25, 1949  4 Sheets-Sheet 2
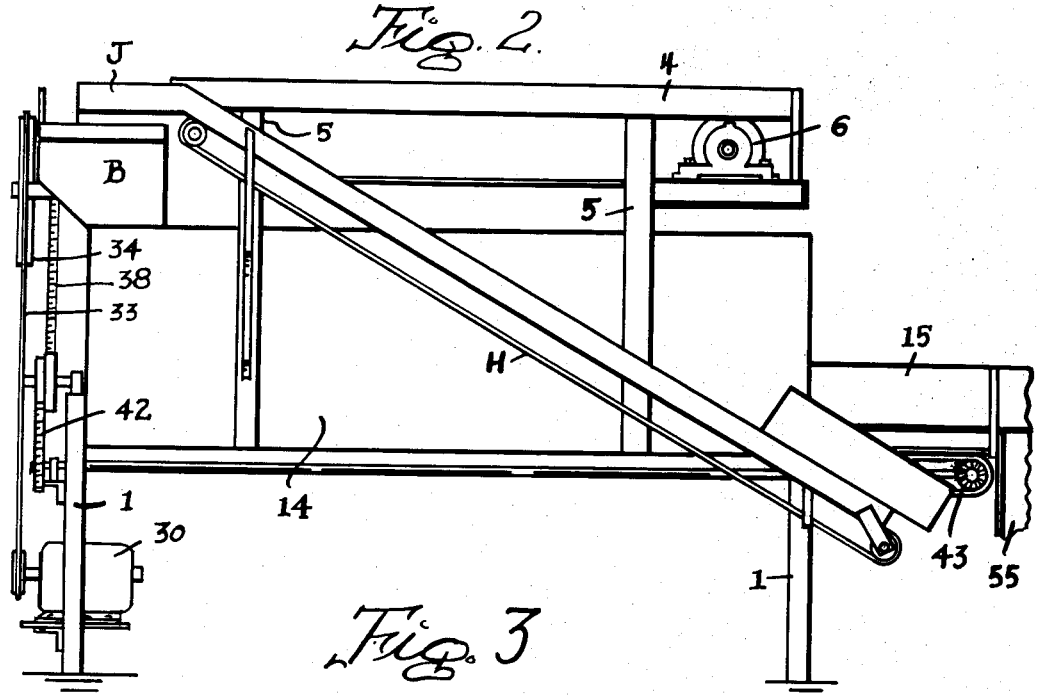
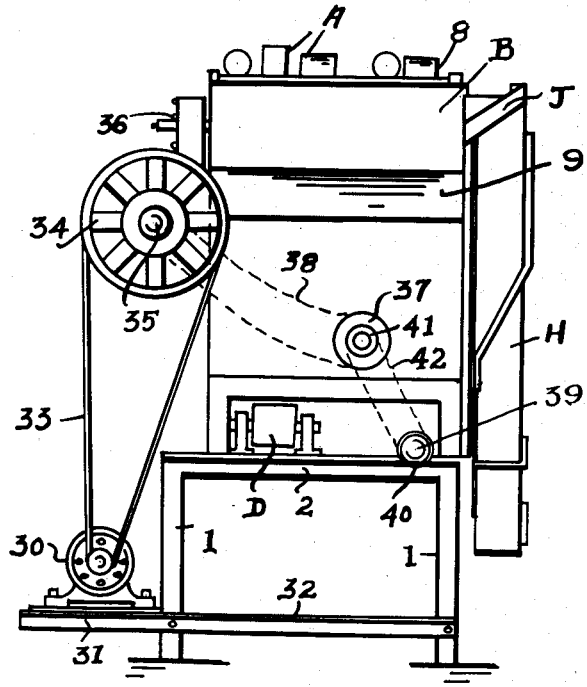
INVENTORS
REED F. FOX
CARL N. FOX
BY Pattison, Wright & Pattison
ATTORNEYS

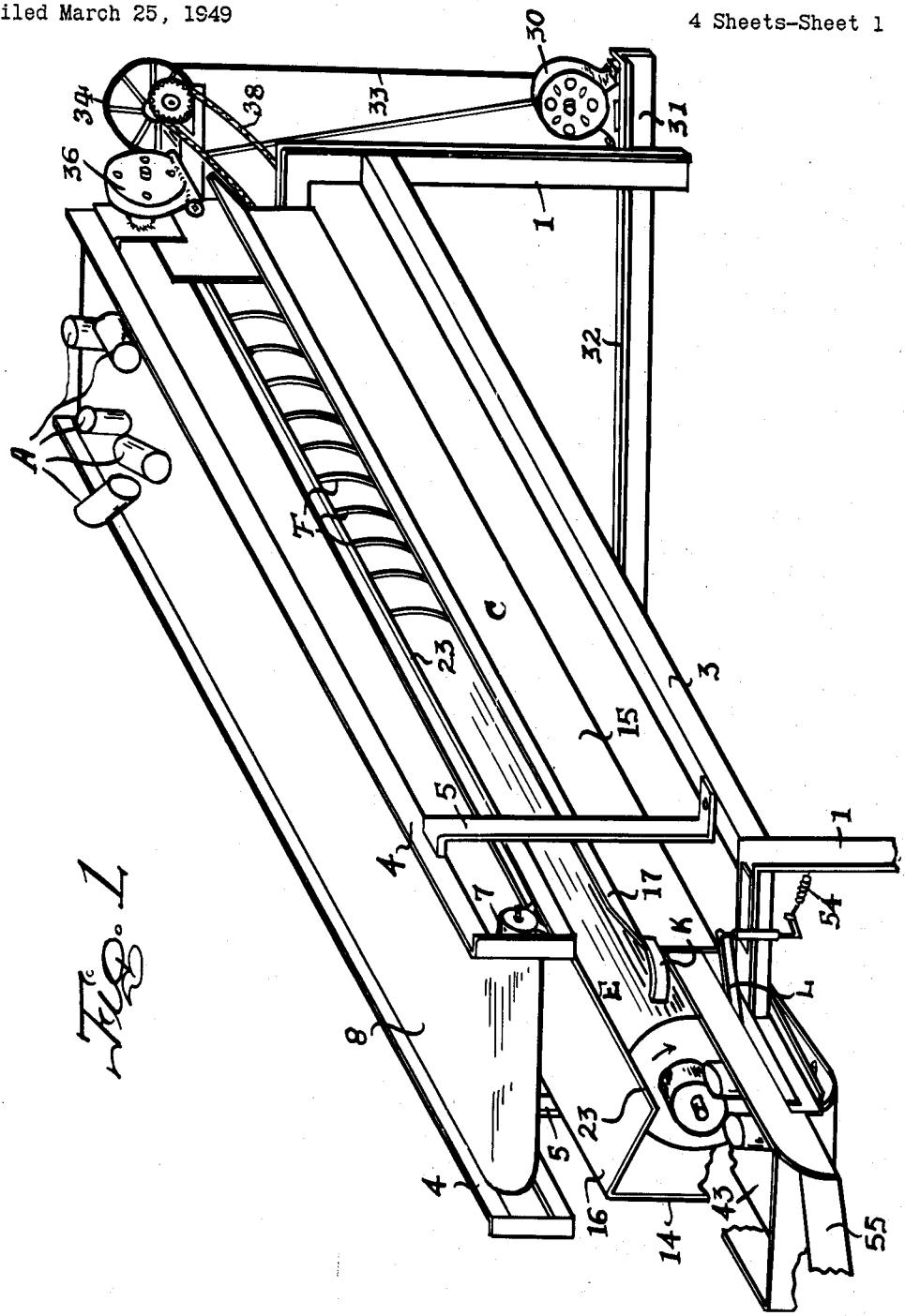

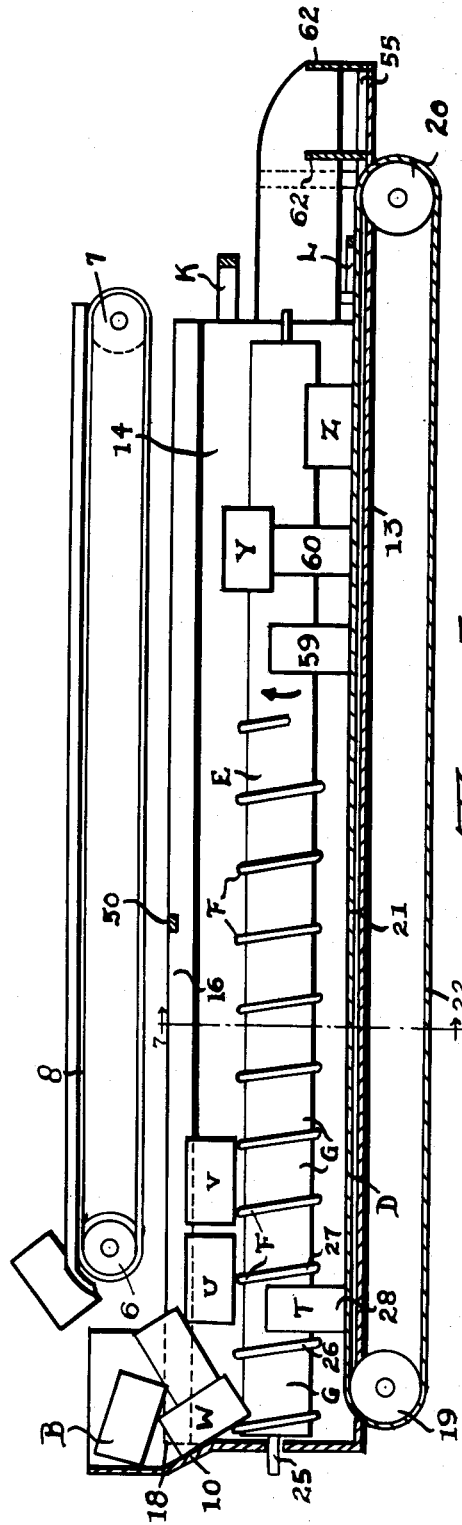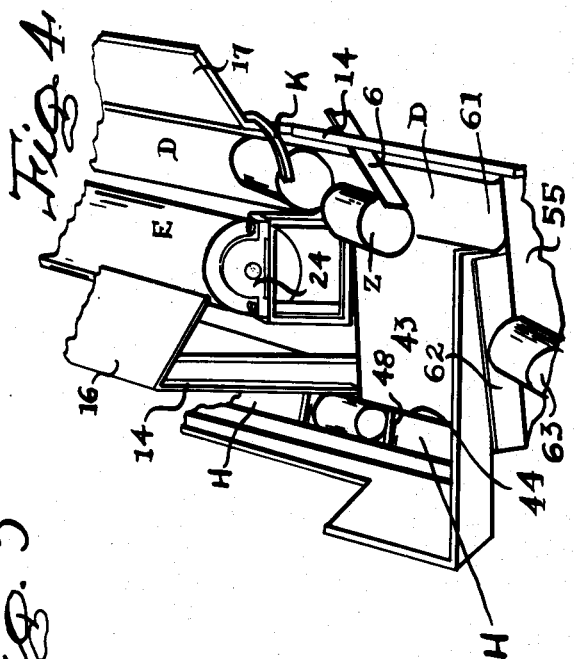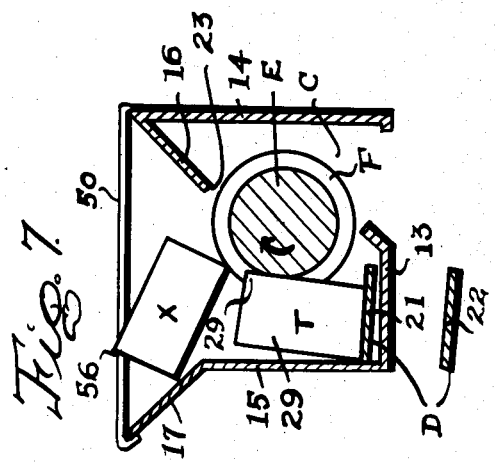

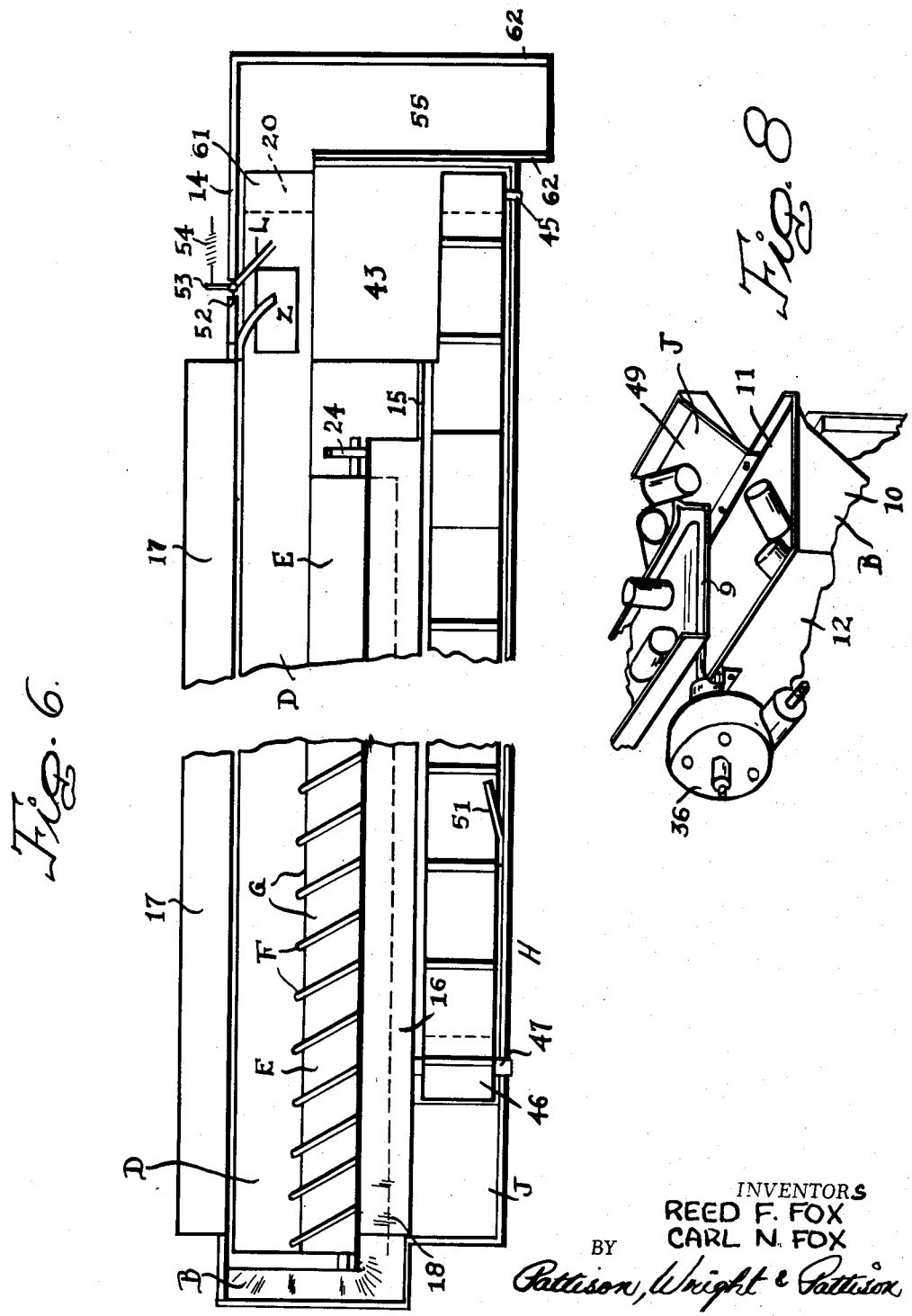

United States Patent Office 2,719,624
Patented Oct. 4, 1955

2,719,624

ARTICLE HANDLING AND ORIENTING MACHINE

Reed F. Fox and Carl N. Fox, Bryan, Ohio

Application March 25, 1949, Serial No. 83,433

7 Claims. (Cl. 198—33)

This invention relates to a machine which will take a mass of disarranged or scrambled cylindrical shaped objects or articles and automatically position them on their ends and deliver them in this position.

The particular size or nature of the articles is unimportant as the machine can be made to operate upon any cylindrical article but the machine is particularly well adapted for handling cans and accordingly the machine is described and illustrated as manipulating or orienting cans to deliver them in an up-ended position.

The primary object of the invention is accordingly the provision of a machine for automatically up-ending cylindrical articles from a mass of disarranged or scrambled articles.

Another object of the invention is the provision of a machine of the character described in which any unerected articles are automatically removed before delivery and returned through the machine for delivery in erected position.

Another and further object of the invention is the provision of a machine of the character described having novel conveyor means for progressing the articles through the machine for delivery and returning unerected articles for remanipulation by the machine.

A still further object of the invention is the provision of a novel auger-like conveyor which in combination with a wall of the machine provides travelling article reception pockets.

Another and still further object of the invention is the provision of a machine of the character described which is power driven and is completely automatic in that no manual attention to or handling of the articles is necessary from the time the articles are delivered to the machine until they are discharged therefrom.

A still further object of the invention is the provision of a machine of the character described which is sturdy, comparatively simple of construction, highly durable and yet comparatively cheap of production.

Other objects and advantages of the invention will appear from the following description when read in the light of the accompanying drawings.

In the drawings wherein the machine is illustrated as operating upon cans:

Fig. 1 is a perspective view looking longitudinally of one side of the machine.

Fig. 2 is a side view of the opposite side of the machine.

Fig. 3 is an end view of the reception end of the machine.

Fig. 4 is a fragmentary perspective view of the delivery end of the machine.

Fig. 5 is a longitudinal vertical sectional view through the machine, the supporting frame therefor being omitted.

Fig. 6 is a top plan view of the machine, the upper can delivery conveyor being omitted.

Fig. 7 is a vertical sectional view on the line 7—7 of Fig. 5.

Fig. 8 is a fragmentary perspective view of the can receiving end of the machine.

In general the machine comprises at its top a longitudinally extending power driven endless conveyor to which the mass of disarranged or scrambled cans are delivered. This conveyor delivers the cans to a hopper at the can reception end of the machine. This hopper has an outlet end communicating with the upper face of a second power driven and longitudinally extending endless conveyor adjacent which is a power driven longitudinally extending auger. The construction is such that a series of can pockets are provided between this auger and an adjacent side wall of the machine. These pockets are of the proper size to receive a single erected or up-ended can. The conveyor delivers these cans to the delivery end of the machine. It is possible that cans which are not up-ended, that is cans which are on their side, may travel through the machine. Provision is made for up-ending some of said cans while they are in transit through the machine. Those cans which are not up-ended and reach the delivery end of the machine on their side are automatically removed or discharged from the conveyor into a hopper having an outlet communicating with the upper face of a third power driven longitudinally extending endless conveyor. This conveyor travels toward the reception end of the machine and returns the cans which are on their side to the hopper at the reception end of the machine so that they will be rehandled by the machine and eventually delivered in erected or up-ended position. This machine is for use in combination with other machinery or apparatus as for instance for the delivery of up-ended or erected cans to a boxing, labelling or elevating machine. No illustration is made of the particular machine or apparatus which will be associated with the machine constituting the present invention as such associated apparatus does not form a part of the present invention. There are many different kinds of machines where it is important and necessary to deliver the cans or other cylindrical articles all similarly positioned such as the erection of the particular articles upon their ends.

In plan the machine is rectangular shaped and is supported upon an openwork frame or base having corner legs 1 interconnected transverse the frame by a cross bar 2. The frame is completed by longitudinally extending side bars 3.

At each side of the machine above a side bar 3 a longitudinally extending rectangular frame 4 is supported upon suitable legs 5. These frames are disposed in a vertical plane and adjacent each of their ends are provided with rotatably supported rollers 6 and 7. The roller 7 is at the reception end of the machine and is power driven in a manner hereinafter to be described. An endless conveyor 8 disposed in a horizontal plane is trained over these rollers and it is to this conveyor that the disarranged or scrambled cans are delivered. These disarranged cans are designated in their entireties in Figs. 1 and 3 by A.

The conveyor 8 at its delivery end drops cans downwardly over the transversely extending shoe 9 which is disposed above the upper open end of a hopper, designated as an entirety by B, at the reception end of the machine. This hopper constitutes an enlarged end of a trough C which extends throughout the greater length of the machine immediately beneath the upper conveyor 8. Specifically the hopper has a closed outer end 10, a downwardly and inwardly extending side wall 11, and an oppositely positioned substantially vertically disposed side wall 12. The trough is in communication with the inner end of the hopper and is substantially U-shaped in cross sectional configuration and comprises a bottom 13 and oppositely disposed parallel side walls 14 and 15. The upper end of the side wall 14 is downwardly inclined as at 16 while the upper end of the side wall 14 is upwardly and outwardly inclined as at 17. The wall 14 stops short of the hopper as indicated at 18 in Figs. 5 and 6 of the drawings.

An endless conveyor D extends throughout the length of the trough and outwardly beyond the same so that it extends substantially throughout the entire length of the machine or supporting frame. This conveyor is trained over the rotatably mounted rollers 19 and 20 which are suitably rotatably supported upon the supporting frame. The roller 19 is power driven in a manner to be hereinafter described.

The conveyor is of slightly greater width than the diameter of the particular cans being handled by the machine. The trough bottom 13 is between the upper run 21 and lower run 22 of the conveyor. The conveyor transversely is disposed at an angle to the horizontal so that it tilts downwardly and inwardly towards the center of the trough as is clearly illustrated in Fig. 7 of the drawings.

A cylindrical auger E extends throughout the length of the machine. It is disposed in the trough C and slightly overhangs the inner edge of the conveyor D. The auger is spaced from the bottom and side walls of the trough and its uppermost face is in spaced relationship to the end 23 of the wall portion 16 which end overhangs the auger to some extent. The auger is rotatably mounted at its opposite ends in suitable bearings such as 24, see Fig. 4 of the drawings, and extends through and outwardly beyond the rear wall 10 of the hopper B. The auger at this end has its shaft 25 connected, in a manner hereinafter to be described, to a suitable source of power which continuously rotates the auger about its longitudinal axis.

From its end within the lower open end of the hopper to a point throughout the greater length of the trough C the auger externally is provided with spirally arranged tooth-like enlargement or protrusion designated as an entirety by F. This continuous spiral tooth can be cast as a part of the auger or can comprise a round rod wound spirally around the auger and suitably secured thereto as by welding. The convolutions on the auger are spaced apart a distance sufficiently great as to permit the side of an up-ended can to engage the face of the auger. Consequently these convolute protrusions form along the auger a series of can reception pockets G for the reception of cans of varying diameters. As the dimensions of the cans lengthwise is considerably greater than their diameters it is impossible for a can, other than an up-ended one, to enter an auger pocket. The cans which have not entered an auger pocket are designated at U and V in Fig. 5. Additionally the outer face of the auger is spaced from the side wall 15 of the trough a distance only slightly greater than the diameter of a can. The distance from the outer faces of the convolutes F of the auger and the wall 15 of the trough is less than the diameter of a can. Consequently a can which is on its side cannot fall downwardly between the auger and the side wall of the trough. Cans which are disposed on their sides, such as the cans U and V, are carried upwardly by the rotation of the auger which is in the direction indicated by arrows in Figs. 5 and 7 of the drawings. This co-relationship of dimensions clearly appears in Fig. 7 of the drawings wherein it will also be seen that the upper end 29 of the can T lies against the face of the auger due to the inclination of the conveyor D. The inward tilt imparted to the can prevents frictional engagement of the side wall of the can with the wall 15 during the travel of the can through the trough.

In actual operation the speed of travel of the conveyor D and the speed of rotation of the auger E are synchronized so that the auger convolutions tend to neither push nor retard the cans. Travel of the cans through the machine is dependent upon their engagement with the conveyor D.

The main motive power for the moving parts of the machine is an electric motor 30, which for convenience and to render the machine portable, is suitably supported on the outer extending end 31 of a cross bar 32 which extends between the legs 1 at the receiving end of the machine. A belt 33 interconnects a motor and a pulley wheel 34. The shaft 35 of the pulley wheel extends into a suitable gear box 36 which has driving connection with the roller 6 of the upper conveyor belt 8. The shaft 35 carries a gear wheel, not shown, which is connected to a gear 37 on the shaft 25 of the auger by a chain 38 or the like. The roller 20 of the conveyor D is provided with a drive shaft 39 which at the delivery end of the machine is provided with a gear or sprocket 40 which is interconnected with a second gear 41, carried by the auger shaft 25, by a chain 42 or the like.

It will be seen in Fig. 4 that at the delivery end of the machine the auger E stops short of the length of the machine and that the trough wall 14 terminates with the auger. Beyond the end of the auger and this wall of the trough the trough bottom slants downwardly as at 43 away from the conveyor belt D. The open lower side 44 of the trough bottom portion 43 will permit cans which roll down across the inclined trough bottom to drop onto the lower end of an endless conveyor H. This conveyor adjacent this end of the machine is trained over a rotatably mounted roller 45 and from this roller extends upwardly alongside of the machine toward the receiving end of the machine at which point it is trained over the roller 46 mounted on an outwardly extending end 47 of the shaft which carries the roller 6 of the conveyor 8. As a consequence of this construction the conveyor H is driven by the driving means of the roller 6 of the conveyor 8 and at substantially the same speed as the conveyor 8. This conveyor carries transversely extending cleats 48 which are spaced apart a distance greater than the length of the cans being handled by the machine. At its upper end the conveyor terminates in a stationary platform J having a downwardly and inwardly inclined bottom 49 the lower end of which is at and above the side 11 of the can reception hopper B.

A bar or stop 50 extends transverse the upper end of the trough side walls 14 and 15 at a point a short distance inward of the can hopper B. The purpose of this bar will be explained later.

A resilient finger 51 is carried by the trough side wall 15, see Fig. 6, at a point inward of the trough in respect to the can hopper B. This finger is disposed in a plane above the top of up-ended cans on the conveyor D and extends inwardly from the wall 15 so as to overhang the conveyor D and any cans up-ended thereon. The purpose of this finger will be described hereinafter.

Closely adjacent the discharge end of the machine at a point opposite the transversely inclined trough bottom portion 43 a pair of fingers K and L are provided. Both of these fingers are mounted on the trough side wall 14 and extend inwardly therefrom to overhang the conveyor D. The finger K is arc-shaped and in advance of the finger L. The finger K is rigid and is disposed in a vertical plane above the upper ends of cans which are disposed in up-ended position upon the conveyor D. The finger L is pivotally mounted as at 52, see Fig. 6, and has an outwardly extending arm 53 to which is attached a spring 54 or other tension applying device. The spring 54 normally holds the finger in the position indicated in Fig. 6, that is with the finger extending obliquely across the conveyor D, but it will be apparent that if sufficient pressure is exerted upon the finger L it can swing backwardly against the inner face of the trough side wall 14. The functions of these fingers will be hereinafter explained.

At its discharge end the machine is provided with a transversely disposed and downwardly inclined chute 55 the upper end of which extends across the discharge end of the conveyor D, but is in a horizontal plane below the conveyor.

The operation of the machine is as follows: The mass of disarranged or scrambled cans is dumped upon the upper conveyor 8 and they are carried by it and discharged into the hopper B. The downwardly inclined portion 16 of the trough side wall 14 prevents these cans from reaching the wrong side of the auger 9. Some of the cans moving out of the lower open end of the hopper, such as for instance can W in Fig. 5, will immediately enter a pocket G of the auger as has the can T. Other cans however falling from the hopper onto the auger may assume the position of the can U so that they lie upon one of the convolute ribs of the auger and against the wall 15 of the trough. As the auger is rotating it will be seen however that the balance point supporting the can U will be changed with the result that the can will tilt into an up-ended position and drop into the first unoccupied auger pocket G.

It is intended that the speed of travel of the conveyor 8 be such as to feed cans into the hopper B at a speed less than its capacity so that the machine will not become overloaded and plugged. It is however possible to overload the machine and it is possible for cans to assume positions different from those immediately above described. For instance a can may assume the position of the can X appearing in Fig. 7 of the drawings. Should this can not drop into an auger pocket but be moved along with the auger its end 56 will strike the rod 50 which will stop the movement of the can and cause its lower end to fall downwardly so that the can will drop into the first vacant or available auger pocket G.

Should a can assume the position of can V, Fig. 5, ordinarily this can will be caused to drop into the first available auger pocket due to the fact that the point of support of the can on the auger convolutes will be constantly changing due to the rotation of the auger. If however this does not occur this can when it reaches the spring finger 51 will be engaged by the finger which will stop the forward motion of the can and tend to push the can against the convolutes of the auger the rotation of which will up-right or up-end the can and let it drop into the first available vacant pocket G of the auger.

The auger convolutes end short of the discharge end of the auger, as has been mentioned, at the point 57. From this point onward toward the discharge end of the machine the outer face of the auger is smooth.

When the feed of cans to the machine is too fast or too heavy it is possible for cans to assume the positions of the cans Y and Z illustrated in Fig. 5. The can Y is moving toward the discharge end of the machine because it is supported on the upper end of a can which is supported upon and moving along with the conveyor D. The can Z is of course resting directly on its side on the moving conveyor D. When the can Z reaches the resilient finger L this finger will cause the can to roll transverse the conveyor belt down the inclined bottom portion 43 of the trough and onto the conveyor H which will convey it back to the hopper B for reworking by the machine. When the can Y reaches the finger K this finger will push the can from the upper end of the can upon which it is resting and cause it to drop onto the inclined chute bottom 43 down which it will roll to the conveyor H and be carried back to the hopper for reworking by the machine.

The up-ended cans such as the can T and the cans 59 and 60 move smoothly towards the discharge end of the conveyor D. They pass beneath the finger K without any engagement therewith and have sufficient frictional engagement with the conveyor as to overcome the light tension of the spring 54 of the finger L with the result that they push past the finger L moving the finger back toward the trough wall 14.

When an up-ended can on the conveyor D reaches the final discharge end 61 of the conveyor D the can is caused to topple on its side into the chute 55. The ends of the cans are in proper alignment with the side walls or rails 62 of the chute with the result that the cans roll smoothly down and out of the chute to the boxing machine or other mechanism which is associated with the chute. It is not possible to let cans which come through the machine on their sides, as for instance can Z, Figs. 4 and 6, to go to the end 61 of the conveyor D because they will not be properly discharged into the chute and will jam or wedge therein by reason of the fact that they will not reach the chute when properly aligned with the side rails of the chute. An up-ended can which is toppled from the discharge end 61 of the conveyor D into the chute 55 is illustrated at 63 in Fig. 4.

It will be seen that by varying the distance between the face of the auger E and the wall 15 of the trough C and varying the space between the convolute ribs on the auger the machine can be made to accommodate cans or other cylindrical articles of different diameters.

We claim:

1. In a machine for similarly arranging cylindrical shaped articles, a hopper for the reception of indiscriminately arranged articles, a horizontally disposed elongated tubular element mounted for rotation about its longitudinal axis, a rib extending spirally about the element to render it auger-like in nature, a flat stationary wall paralleling one side of said auger and in spaced relation to the face thereof, the auger with its rib and the adjacent wall providing a plurality of successively arranged pockets of a size to receive an up-ended article but too small to receive an article disposed upon its side, a conveyor disposed between the auger and the wall and supporting articles disposed up-ended in said pockets, the auger and the conveyor having ends disposed in the hopper, the article supporting surface of the conveyor being inclined downwardly and inwardly toward the auger to cause the upper ends of the conveyor supported articles to engage the auger under gravitational force, and power means for rotating the auger and driving the conveyor.

2. In a machine for similarly arranging cylindrical shaped articles, a hopper for the reception of indiscriminately arranged articles, a horizontally disposed elongated rotatable auger-like element having an end disposed in said hopper and extending outwardly therefrom, a rib extending spirally about the auger, the convolutions of said rib being spaced apart a distance slightly greater than the diameter of the articles, a flat stationary wall paralleling one side of said auger and spaced from the face of the auger a distance slightly greater than the diameter of said articles, the distance from said wall to the outer face of the rib being less than the diameter of the articles, a conveyor extending throughout and beyond the length of the auger, said conveyor being positioned between the wall and the auger and being horizontally disposed in a plane beneath the top of the auger, and power means for rotating the auger and deriving the conveyor.

3. In a machine for similarly arranging cylindrical shaped articles, a hopper adapted to receive a mass of indiscriminately arranged articles, a horizontally disposed elongated tubular element extending from said hopper toward the discharge end of the machine, said element being mounted for rotation about its longitudinal axis and having a rib extending spirally about its outer face to render said element auger-like in nature, a flat stationary wall paralleling one side of said auger in spaced relationship thereto and forming in combination with the auger a plurality of pockets the widths of which are defined by the rib, said pockets having a width slightly greater than the diameter of the articles, a conveyor positioned between the auger and the wall and adapted to support up-ended articles disposed in said pockets, and power means for driving the conveyor and rotating said auger.

4. A construction as defined in claim 3 wherein, a finger is provided at a position intermediate the length of the auger and over-hanging the top of the auger, said finger being positioned in the path of travel of an article resting on its side on the auger top and traveling along the auger in said position, and said finger operating to arrest the movement of such an article to cause the article to fall in an up-ended position in a vacant pocket.

5. In a machine for similarly arranging cylindrical shaped articles, a hopper for the reception of indiscriminately arranged articles, a horizontally disposed elongated tubular element mounted for rotation about its longitudinal axis, a rib extending spirally about the element to render it auger-like in nature, a flat stationary wall paralleling one side of said auger and in spaced relation to the face thereof, the auger with its rib and the adjacent wall providing a plurality of successively arranged pockets of a size to receive an up-ended article but too small to receive an article disposed upon its side, a conveyor disposed between the auger and the wall and supporting articles disposed up-ended in said pockets, the auger and the conveyor having ends disposed in the hopper, the article supporting surface of the conveyor being inclined downwardly and inwardly toward the auger to cause the upper ends of the conveyor supported articles to engage the auger under gravitational force, a finger extending over the conveyor at a point beyond the discharge end of the auger, said finger being pivotally mounted and normally disposed in the path of travel of any article resting directly on the conveyor, the finger being movable about its pivotal support against resilient tension to permit the passage of articles along the conveyor, the tension of the finger holding it against movement when engaged by an article resting on the conveyor upon its side and operating to discharge such an article from the side of the conveyor, the finger being movable against said tension when engaged by an article disposed in an up-ended position upon the conveyor to permit the passage of such an article along the conveyor, and power means for rotating the auger and driving the conveyor.

6. In a machine for similarly arranging cylindrical shaped articles, a hopper adapted to receive a mass of indiscriminately arranged articles, a horizontally disposed elongated tubular element extending from said hopper toward the discharge end of the machine, said element being mounted for rotation about its longitudinal axis and having a rib extending spirally about its outer face to render said element auger-like in nature, a flat stationary wall paralleling one side of said auger in spaced relationship thereto and forming in combination with the auger a plurality of pockets the widths of which are defined by the rib, said pockets having a width slightly greater than the diameter of the articles, a conveyor positioned between the auger and the wall and adapted to support up-ended articles disposed in said pockets, a finger extending over the conveyor at a point beyond the discharge end of the auger, said finger being pivotally mounted and normally disposed in the path of travel of any article resting directly on the conveyor, the finger being movable about its pivotal support against resilient tension to permit the passage of articles along the conveyor, the tension of the finger holding it against movement when engaged by an article resting on the conveyor upon its side and operating to discharge such an article from the side of the conveyor, the finger being movable against said tension when engaged by an article disposed in an up-ended position upon the conveyor to permit the passage of such an article along the conveyor, and power means for driving the conveyor and rotating said auger.

7. An apparatus for aligning articles disposed in helter-skelter relationship comprising a frame, a pair of elements mounted on said frame, said elements being horizontally spaced from one another to provide a space for receiving the articles, one of said elements being a roll provided with a longitudinally extending helical rib on the periphery thereof, means for rotating the roll element, the other of said elements forming a plain surface extending parallel with the confronting peripheral surface of the roll element, means retaining said other element stationary during rotation of said roll element, a base conveyor supported by said frame having a run movable below the spaced elements and cooperating with said elements and rib to provide a plurality of article-receiving pockets and to effect bottom support of articles and move said articles longitudinally between said elements, means for moving the conveyor and means for delivering articles to one end of said elements.

References Cited in the file of this patent

UNITED STATES PATENTS

| 769,567 | Rice | Sept. 6, 1904 |
| 1,750,328 | Patchen | Mar. 11, 1930 |
| 1,886,896 | Nelson | Nov. 8, 1932 |
| 2,336,606 | Everett | Dec. 14, 1943 |
| 2,369,557 | Gettleman | Feb. 13, 1945 |
| 2,377,431 | Lasko | June 5, 1945 |
| 2,592,141 | Holdren | Apr. 8, 1952 |